(12) United States Patent
Brandvold et al.

(10) Patent No.: US 10,920,151 B2
(45) Date of Patent: Feb. 16, 2021

(54) PROCESSES FOR PRODUCING A BURNER FUEL FROM A BIOMASS FEED

(71) Applicant: UOP LLC, Des Plaines, IL (US)

(72) Inventors: Timothy A. Brandvold, Arlington Heights, IL (US); Lance A. Baird, Prospect Heights, IL (US)

(73) Assignee: UOP LLC, Des Plaines, IL (US)

( * ) Notice: Subject to any disclaimer, the term of this patent is extended or adjusted under 35 U.S.C. 154(b) by 182 days.

(21) Appl. No.: 16/198,558

(22) Filed: Nov. 21, 2018

(65) Prior Publication Data

US 2019/0093021 A1 Mar. 28, 2019

Related U.S. Application Data

(63) Continuation of application No. PCT/US2017/037312, filed on Jun. 13, 2017.

(60) Provisional application No. 62/351,368, filed on Jun. 17, 2016.

(51) Int. Cl.
| | |
|---|---|
| *C10L 1/12* | (2006.01) |
| *C10G 3/00* | (2006.01) |
| *C11C 3/00* | (2006.01) |
| *C11C 3/12* | (2006.01) |
| *C10G 7/00* | (2006.01) |
| *C10G 61/02* | (2006.01) |
| *C10L 1/02* | (2006.01) |
| *C10L 1/04* | (2006.01) |

(52) U.S. Cl.
CPC ............... *C10G 3/50* (2013.01); *C10G 7/00* (2013.01); *C10G 61/02* (2013.01); *C10L 1/02* (2013.01); *C10L 1/04* (2013.01); *C11C 3/00* (2013.01); *C11C 3/12* (2013.01); *C10G 2300/1014* (2013.01); *C10G 2300/302* (2013.01); *C10G 2300/308* (2013.01); *C10L 2200/0484* (2013.01); *C10L 2270/08* (2013.01); *C10L 2290/06* (2013.01); *C10L 2290/543* (2013.01); *Y02P 30/20* (2015.11)

(58) Field of Classification Search
CPC ............ C10G 3/50; C10G 7/00; C10G 61/02
USPC .......................................................... 431/2
See application file for complete search history.

(56) References Cited

U.S. PATENT DOCUMENTS

| | | | |
|---|---|---|---|
| 8,329,969 B2 | 12/2012 | McCall et al. | |
| 8,912,376 B2 | 12/2014 | Preau | |
| 9,068,126 B2 | 6/2015 | Baird et al. | |
| 9,080,109 B2 | 7/2015 | Brandvold | |
| 2009/0301930 A1* | 12/2009 | Brandvold | C10G 45/58 208/17 |
| 2012/0043194 A1 | 2/2012 | Lepez et al. | |

(Continued)

FOREIGN PATENT DOCUMENTS

WO 2012035410 A2 3/2012

*Primary Examiner* — Vivek K Shirsat
(74) *Attorney, Agent, or Firm* — Paschall & Associates, LLC; James C. Paschall (57) ABSTRACT

Processes for partially deoxygenating a biomass-derived pyrolysis oil to produce a fuel for a burner are disclosed. A biomass-derived pyrolysis oil stream is combined with a low recycle stream that is a portion of a deoxygenated effluent to form a heated diluted py-oil feed stream, which is contacted with a first deoxygenating catalyst in the presence of hydrogen at first hydroprocessing conditions effective to form the effluent stream. The effluent may be separated and used to provide a product fuel stream for a burner.

19 Claims, 3 Drawing Sheets

(56) References Cited

U.S. PATENT DOCUMENTS

| | | |
|---|---|---|
| 2013/0152454 A1 | 6/2013 | Baird et al. |
| 2013/0158329 A1 | 6/2013 | Brandvold |
| 2013/0305593 A1 | 11/2013 | Eizenga et al. |
| 2013/0345847 A1 | 12/2013 | Valcore, Jr. et al. |
| 2014/0021101 A1* | 1/2014 | Schabron ............... C10G 21/30 208/309 |
| 2014/0135544 A1* | 5/2014 | Kalnes .................... C10G 3/50 585/310 |
| 2014/0261715 A1 | 9/2014 | Abhari et al. |
| 2015/0159093 A1 | 11/2015 | Baird et al. |

* cited by examiner

PROCESSES FOR PRODUCING A BURNER FUEL FROM A BIOMASS FEED

CROSS-REFERENCE TO RELATED APPLICATIONS

This application is a Continuation of copending International Application No. PCT/US2017/037312 filed Jun. 13, 2017, which application claims priority from U.S. Provisional Application No. 62/351,368 filed Jun. 17, 2016, the contents of which cited applications are hereby incorporated by reference in their entirety.

FIELD OF THE INVENTION

The present invention generally relates to processes for producing fuels from renewable resources, and more particularly relates to processes for producing a burner fuel from the catalytic deoxygenation of biomass-derived pyrolysis oil.

BACKGROUND OF THE INVENTION

Fast pyrolysis is a process during which organic carbonaceous biomass feedstock, i.e., "biomass", such as wood waste, agricultural waste, algae, etc., is rapidly heated to between about 300 to about 900° C. (572 to 1,652° F.) in the absence of air using a pyrolysis reactor. Under these conditions, solid products, liquid products, and gaseous pyrolysis products are produced. A condensable portion (vapors) of the gaseous pyrolysis products is condensed into biomass-derived pyrolysis oil (commonly referred to as "py-oil").

However, biomass-derived pyrolysis oil is a complex, highly oxygenated organic liquid having properties that currently limit its utilization as a biofuel. For example, biomass-derived pyrolysis oil has high acidity and a low energy density attributable in large part to oxygenated hydrocarbons in the oil, which can undergo secondary reactions during storage particularly if the oil is stored at elevated temperatures. As used herein, "oxygenated hydrocarbons" or "oxygenates" are organic compounds containing hydrogen, carbon, and oxygen. Such oxygenated hydrocarbons in the biomass-derived pyrolysis oil include carboxylic acids, phenols, cresols, alcohols, aldehydes, etc. Conventional biomass-derived pyrolysis oil may comprise about 30% or greater by weight oxygen from these oxygenated hydrocarbons.

Conversion of biomass-derived pyrolysis oil into biofuels suitable for transportation fuels (gasoline, diesel, aviation fuel) requires essentially full deoxygenation of the biomass-derived pyrolysis oil. Such deoxygenation may proceed via two main routes, namely the elimination of either water or carbon dioxide. However, in some instances, in may be desirable to produce a combustible biofuel product that can be used in applications with less stringent fuel standards, such as a burner, for heat.

As mentioned above, the fuel for a burner does not have as stringent standards compared to transportation fuels, though it does need to have stable viscosity for consistent atomization and should have constant heat content for proper control of the heating process. Consequently, the complete upgrading of py-oil provides acceptable fuel for a burner, but it does so at a higher cost, both in terms of capital expenditures, as well as operating costs, for example, based upon the hydrogen consumption.

Accordingly, it is desirable to provide methods for producing a fuel for a burner from a biomass-derived pyrolysis oil without fully treating the biomass-derived pyrolysis oil.

SUMMARY OF THE INVENTION

One or more processes for producing a fuel for a burner from a biomass-derived pyrolysis oil have been invented in which the biomass-derived pyrolysis oil is partially deoxygenated to provide a fuel for a burner that has improved viscosity stability and energy density compared to biomass-derived pyrolysis oil. By only partially upgrading the py-oil, the costs, capital and operating, may be lowered for producing the fuel for a burner. As used herein, "burner" means a device that combusts a fuel to produce heat and can be any industrial burner that is fired by a mixture of air and fuel, where the fuel can comprise any combustible liquid, solid or gas, for example, natural gas, liquid hydrocarbons or coal. Burners typically are mounted in the walls, roofs or floors of fired equipment and are characterized by an open flame design that provides direct heat to the material that requires heating, either through radiant heat transfer or convection heat transfer or both. Multiple burners are usually employed within the various fired equipment designs, with the size and number of the burners dictated by the material or process fluid that requires heating. The combustion zone can be any chamber where the heat and effluent gases from the burner are initially directed after combustion. In some cases, the heat and gases are directed to a radiant heat transfer section as discussed in more detail below. In other situations, the heat from the combustion in the burner is used directly to heat or dry a substance. In this latter circumstance, the combustion zone can be part of a direct or indirect dryer, such as a rotary, continuous, tunnel or tray dryer, or a fluidized bed, calciner, furnace or kiln. The design of such devices is well known to those skilled in the art. The fuel produced according to the various aspects and embodiments of the present invention could be used in any of these burners.

In a first aspect of the invention, the present invention may be characterized broadly as providing a process for producing a partially deoxygenated fuel from a biomass-derived pyrolysis oil by: heating a biomass-derived pyrolysis oil with a recycle stream to form a heated biomass-derived pyrolysis oil, the recycle stream comprising a low-oxygen-py-oil recycle stream; converting the heated biomass-derived pyrolysis oil in the presence of hydrogen in a reaction zone having a catalyst and being configured to deoxygenate and hydrogenate the heated biomass-derived pyrolysis oil and provide a low-oxygen biomass-derived pyrolysis oil effluent; and, separating the low-oxygen biomass-derived pyrolysis oil effluent in a separation zone into at least one aqueous stream, the recycle stream, at least one fuel gas stream, and at least one product fuel stream, the product fuel stream including greater than 1 wt % oxygenates and comprising a fuel for a burner.

In at least one embodiment of the present invention, a weight ratio of the recycle stream to biomass-derived pyrolysis oil is between about 3:1 and 16:1.

In at least one embodiment of the present invention, the recycle stream comprises between about 7 to about 28 wt % oxygenates. It is contemplated that the recycle stream comprises between about 12 to about 25 wt % oxygenates.

In at least one embodiment of the present invention, the process includes mixing an additive with the biomass-derived pyrolysis oil before the biomass-derived pyrolysis oil is heated.

In at least one embodiment of the present invention, the recycle stream includes a portion of a water stream from the separation zone.

In at least one embodiment of the present invention, the separation zone includes a distillation column being operated with a cutpoint of between about 190 to 230° C. (374 to 446° F.) to separate at least one product fuel stream.

In at least one embodiment of the present invention, the process includes increasing a temperature of the heated biomass-derived pyrolysis oil in order to increase oligomerization reactions within the reaction zone.

In at least one embodiment of the present invention, the process includes decreasing a ratio of recycle stream to biomass-derived pyrolysis in order to increase oligomerization reactions within the reaction zone.

In at least one embodiment of the present invention, the process includes burning the product fuel stream in a burner.

In a second aspect of the invention, the present invention may be characterized broadly as providing a single stage process for producing a partially deoxygenated fuel from a biomass-derived pyrolysis oil by: combining a biomass-derived pyrolysis oil with a recycle stream in order to heat the biomass-derived pyrolysis oil and to form a heated biomass-derived pyrolysis oil, the recycle stream comprising a low-oxygen-py-oil recycle stream; passing the heated biomass-derived pyrolysis oil to a deoxygenation zone having a deoxygenation catalyst and being configured to deoxygenate a portion of the heated biomass-derived pyrolysis oil and to provide a low-oxygen biomass-derived pyrolysis oil effluent; passing the low-oxygen biomass-derived pyrolysis oil effluent to a separation zone configured to separate the low-oxygen biomass-derived pyrolysis oil effluent into at least one aqueous stream, at least one fuel gas stream, the recycle stream, and at least one product fuel stream, the product fuel stream comprising a fuel for a burner; and, heating the recycle stream before combining the recycle stream with the biomass-derived pyrolysis oil.

In at least one embodiment of the present invention, the separation zone includes at least one high temperature separator vessel configured to separate the low-oxygen biomass-derived pyrolysis oil effluent into a liquid phase and a gaseous phase. It is contemplated that the at least one high temperature separator vessel provides an aqueous phase, a liquid phase that comprises a non-aqueous liquid phase and the process includes compressing the gaseous phase to form the recycle stream. It is contemplated that the process also includes passing the non-aqueous liquid phase to a distillation column in the separation zone, the distillation column providing an overhead stream, and a bottoms stream, the bottoms stream comprising the product fuel stream. It is contemplated that the process further includes passing the overhead stream from the distillation column to a receiver vessel in the separation zone, the receiver vessel configured to separate the overhead stream into a liquid hydrocarbon stream, a water stream, and a fuel gas stream, wherein a least a portion of the liquid hydrocarbon stream comprises the recycle stream.

In at least one embodiment of the present invention, the process includes passing the gaseous phase from the high temperature separator vessel through a condenser and to a separation vessel configured to provide a water stream and a gaseous stream; and, compressing the gaseous stream to form the recycle stream. It is contemplated that the process includes passing the liquid phase to a distillation column in the separation zone, the distillation column providing an overhead stream, and a bottoms stream, the bottoms stream comprising the product fuel stream. It is contemplated that the process also includes passing the overhead stream from the distillation column to a receiver vessel in the separation zone, the receiver vessel configured to separate the overhead stream into a liquid hydrocarbon stream, a water stream, and a fuel gas stream, wherein a least a portion of the liquid hydrocarbon stream comprises the recycle stream.

In at least one embodiment of the present invention, the recycle stream includes a portion of the water stream from the separation zone.

In at least one embodiment of the present invention, the separation zone includes at least one high temperature separator vessel configured to separate the low-oxygen biomass-derived pyrolysis oil effluent into liquid phase and a gaseous phase, wherein the liquid phase includes water and hydrocarbons.

Additional aspects, embodiments, and details of the invention, all of which may be combinable in any manner, are set forth in the following detailed description of the invention.

BRIEF DESCRIPTION OF THE DRAWINGS

One or more exemplary embodiments of the present invention will be described below in conjunction with the following drawing figures, in which.

DETAILED DESCRIPTION OF THE INVENTION

As mentioned above, processes for producing a fuel for a burner from a biomass-derived pyrolysis oil have been invented. Pyrolysis oil from biomass is a useful, renewable fuel with low greenhouse gas emissions. However, pyrolysis oil has certain properties, including thermal instability and high water and acid content that limit the utility of pyrolysis oil as a general burner fuel. These properties necessitate special handling, including addition of additives for viscosity stabilization and the use of enhanced materials of construction for feed vessels and lines, pumps, nozzles etc. By improving the thermal stability and reduction of the corrosive compounds in the pyrolysis oil, the processes of the present invention allow for the use of pyrolysis oil as a fuel in applications without special fuel delivery requirements, such as in a burner. The product from the processes described herein is thermally stable and has a very low content of corrosive compounds, so it may be used in fuel-oil capable burner applications without further treatment.

With these general principles in mind, one or more embodiments of the present invention will be described with the understanding that the following description is not intended to be limiting.

Figure 1:
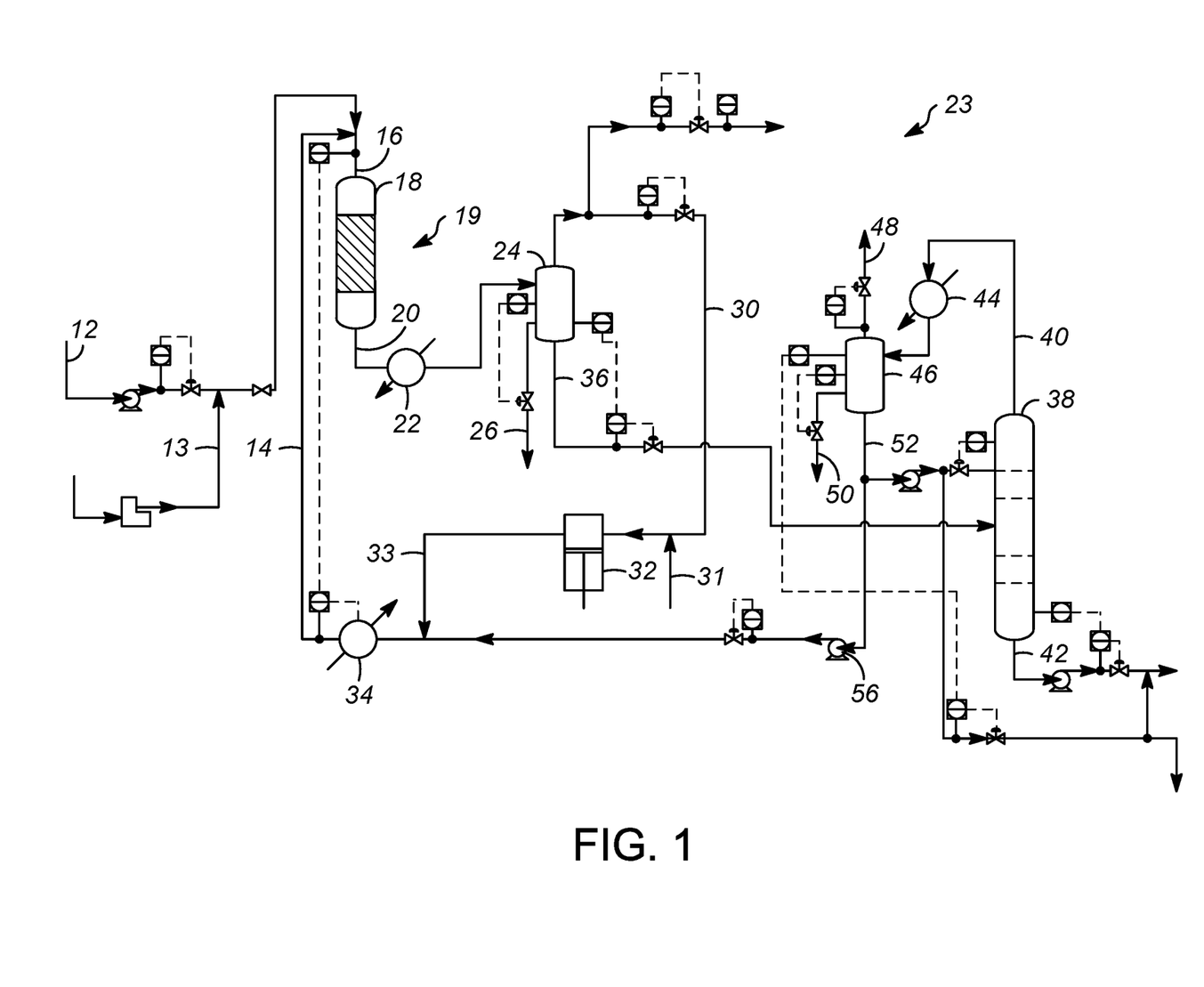
FIG. 1 shows a process flow diagram for a process according to one or more embodiments of the present invention.

Referring to FIG. 1, a process for deoxygenating a biomass-derived pyrolysis oil in accordance with an exemplary embodiment is provided. As illustrated, the process involves a biomass-derived pyrolysis oil stream 12 which may be produced, such as, for example, from pyrolysis of biomass in a pyrolysis reactor. Virtually any form of biomass can be used for pyrolysis to produce the biomass-derived pyrolysis oil. The biomass-derived pyrolysis oil may be derived from biomass material, such as, wood, agricultural waste, nuts and seeds, algae, forestry residues, and the like. The biomass-derived pyrolysis oil may be obtained by different modes of pyrolysis, such as, for example, fast pyrolysis, vacuum pyrolysis, catalytic pyrolysis, and slow pyrolysis or carbonization, and the like.

The composition of the biomass-derived pyrolysis oil can vary considerably and depends on the feedstock and processing variables. Examples of biomass-derived pyrolysis oil "as-produced" can contain up to about 1,000 to about 30,000 ppm total metals, about 20 to about 33 weight percent (wt %) of water that can have high acidity (e.g. total acid number (TAN)>150), and a solids content of from about 0.1 to about 5 wt %. The biomass-derived pyrolysis oil may be untreated (e.g. "as produced"). However, if needed the biomass-derived pyrolysis oil can be selectively treated to reduce any or all of the above feedstock characteristics to a desired level, including pretreatment to reduce metals, solids, water and acidity. Known pretreatment processes are disclosed in, for example, U.S. Pat. Nos. 8,715,490, and 8,864,999. In an exemplary embodiment, the biomass-derived pyrolysis oil comprises an organic phase (i.e., oil comprising primarily oxygenates and/or hydrocarbons along with any dissolved water) that has a residual oxygen content of about 10 wt % or greater, for example of about 30 wt % or greater, for example from about 30 to about 50 wt %, such as from about 35 to about 45 wt % of the organic phase.

The biomass-derived pyrolysis oil may be thermally unstable and may be stored and/or handled so as to reduce its exposure to higher temperatures, thus minimizing secondary polymerization reactions between various components in the biomass-derived pyrolysis oil prior to hydroprocessing. In an exemplary embodiment, the biomass-derived pyrolysis oil stream 12 has as an initial temperature (e.g. storage temperature) of about 100° C. (212° F.) or less, for example from about 0 to about 100° C. (32 to 212° F.), for example from about 15 to about 50° C. (59 to 122° F.), such as about ambient, to inhibit secondary polymerization reactions.

The biomass-derived pyrolysis oil stream 12 may be combined with an additive via line 13, which may comprise a sulfiding agent, for a catalyst (described below), or a stream of phenolic molecules, to control fouling in a reactor (described below). Addition, the biomass-derived pyrolysis oil stream 12 is diluted with a recycle stream 14 which comprises a heated low molecular weight fraction low-oxygen-py-oil diluent recycle stream to form a heated diluted py-oil feed stream 16. Preferably the recycle stream 14 has a higher temperature so that the biomass-derived pyrolysis oil stream 12 is at least partially heated by being combined to form the heated diluted py-oil feed stream 16.

The recycle stream 14 can be introduced to the biomass-derived pyrolysis oil stream 12 in a single stream together with a hydrogen containing gas stream 33, as illustrated and discussed in further detail below. Alternatively, the recycle stream 14 can be introduced to the biomass-derived pyrolysis oil stream 12 in a single or in multiple separate streams that do not include the hydrogen containing gas stream 33. In such cases, the hydrogen containing gas stream 33 can be introduced directly to the heated diluted py-oil feed stream 16 and/or directly to a reactor 18 in a reaction zone 19, and the recycle stream 14 can be introduced to the biomass-derived pyrolysis oil stream 12 absent the hydrogen-containing gas stream 33.

As will be discussed in further detail below, the recycle stream 14 is a fraction of an effluent from the reactor 18 in the reaction zone 19 that has been previously partially deoxygenated, recycled, and heated. As such, the recycle stream 14 has less py-oil reactant components that can undergo secondary polymerization reactions (which result in formation of solids or a viscosity increase of the heated diluted py-oil feed stream 16), and contains some oxygen but less oxygen than the biomass-derived pyrolysis oil stream 12. By having some oxygen in the recycle stream 14, the biomass-derived pyrolysis oil stream 12 and the recycle stream 14 are mutually miscible.

In an exemplary embodiment, the conditions utilized in the reactor 18 are such that the molecules in the heated diluted py-oil feed stream 16 are hydrogenated and partially deoxygenated. It is contemplated that the conversion per pass is limited so that between about 7 to 28 wt % oxygen, or between about 12 to 25 wt % oxygen, is retained in the effluent. In one example, the organic phase of the effluent comprises oxygenates such as phenols, alkyl phenols, alcohols, ethers, and/or the like that are similar to and/or easily solubilize the oxygenates contained in the biomass-derived pyrolysis oil stream 12.

In an exemplary embodiment, the reactor 18 has a temperature of from about 150 to about 275° C. (302 to 527° F.), for example from about 150 to about 250° C. (302 to 482° F.), or from about 200 to about 275° C. (392 to 527° F.). In an exemplary embodiment, the biomass-derived pyrolysis oil stream 12 and the recycle stream 14 are combined at a predetermined recycle ratio that is defined by a mass flow rate of the recycle stream 14 to a mass flow rate of the biomass-derived pyrolysis oil stream 12 to form the heated diluted py-oil feed stream 16 that has a feed temperature below the reactor 18 temperature, and accordingly, may be between 175 to 250° C. (347 to 482° F.). In the instant invention, it is desirable to maximize the yield of fuel oil suitable for heat generation from the process and this is accomplished by reducing the liquid recycle ratio to allow more of the light liquid to polymerize into the fuel oil boiling range and by adjusting the deoxygenation across the reactor 18 so that there is no net yield of lower-boiling range phenolics from the process. In an exemplary embodiment, the biomass-derived pyrolysis oil stream 12 is combined with the recycle stream 14 at the predetermined weight ratio of between about 3:1 to 16:1, depending, in part, on the level of deoxygenation (so that the recycle stream 14 is fully miscible with the biomass-derived pyrolysis oil stream 12).

The reactor 18 can be a continuous flow reactor, such as a fixed-bed reactor, a continuous stirred tank reactor (CSTR), a trickle bed reactor, an ebulliating bed reactor, a slurry reactor, or any other reactor known to those skilled in the art for deoxygenation and hydrogenation, or more generally for hydroprocessing. In the various processes of the present invention, only one stage of deoxygenation is utilized, to provide a partially deoxygenated effluent (not a fully deoxygenated effluent). Thus, the processes may be a single stage process in which only one reactor is used.

The reactor 18 contains a catalyst which, in the presence of hydrogen, is configured to partially deoxygenate and hydrogenate the heated biomass-derived pyrolysis oil and provide a low-oxygen biomass-derived pyrolysis oil effluent 20. In an exemplary embodiment, the catalyst comprises a metal or a combination of metals, such as a base metal(s), a refractory metal(s), and/or a noble metal(s), such as platinum, palladium, ruthenium, nickel, molybdenum, tungsten, and/or cobalt. The metal(s) may be on a support, such as a carbon support, a silica support, an alumina support, a silica-alumina support (amorphous or zeolite), a gamma alumina support, a zirconia support, and/or a titania support. Other catalysts known to those skilled in the art may also be used.

The reactor 18 is preferably operating at typical deoxygenation conditions. In an exemplary embodiment, the deoxygenation conditions include a reactor temperature as mentioned above, between, for example 150 to 275° C. (302 to 527° F.), a reactor pressure of from about 2 to about 20 MPa gauge, a liquid hourly space velocity on a basis of weight of the biomass-derived pyrolysis oil/weight of catalyst/hour ($hr^{-1}$) of from about 0.10 to about 1 $hr^{-1}$, and a hydrogen-containing gas treat rate of from about 1,000 to about 15,000 standard cubic feet per barrel (SCF/B).

In an exemplary embodiment, the heated diluted py-oil feed stream 16 is formed just upstream of the reactor 18 and the feed temperature of the heated diluted py-oil feed stream 16 is at about the reactor temperature to minimize the residence time of the heated diluted py-oil feed stream 16. The term "residence time" as used herein is the amount of time from when the biomass-derived pyrolysis oil stream 12 is combined with the recycle stream 14 to when the heated diluted py-oil feed stream 16 initially contacts the deoxygenating catalyst. By having a relatively short residence time, less secondary polymerization reactions can occur in the heated diluted py-oil feed stream 16 at elevated temperatures before deoxygenation begins. In an exemplary embodiment, the residence time is about 60 seconds or less, for example about 20 seconds or less, for example about 10 second or less, such as from about 10 seconds to about 1 second.

Within the reactor 18, the heated diluted py-oil feed stream 16 contacts the catalyst at the appropriate conditions, in the presence of hydrogen, and forms a low-oxygen biomass-derived pyrolysis oil by converting a portion of the oxygenated hydrocarbons in the biomass-derived pyrolysis oil into hydrocarbons (i.e., partial deoxygenation). In particular, hydrogen from a make-up hydrogen stream (not shown) may be combined with a gaseous hydrogen stream 30 recovered from the low-oxygen biomass-derived pyrolysis oil effluent 20 to form the hydrogen-containing gas stream 33. The hydrogen-containing gas stream 33 hydrogenates any unsaturated bonds, and removes oxygen from a portion of the biomass-derived pyrolysis oil via hydrodeoxygenation, decarboxylation or decarbonylation (collectively "deoxygenation") to produce the low-oxygen biomass-derived pyrolysis oil that comprises an aqueous phase and a hydroprocessed organic phase. The hydroprocessed organic phase comprises oil that is partially deoxygenated with some residual oxygenated hydrocarbons. As mentioned above, the hydroprocessed organic phase of the low-oxygen biomass-derived pyrolysis oil preferably includes a residual oxygen content of from about 7 to about 28 wt %, or from about 12 to about 25 wt %.

It is believed that the benefits of catalytically deoxygenating the biomass-derived pyrolysis oil that is diluted with the recycle stream 14, may result in increasing hydrogen solubility, immolating the exotherm by dilution of the reactive species in the biomass-derived pyrolysis oil stream 12, and reducing the reaction rate of bimolecular reactants that lead to secondary polymerization reactions. As such, simple reactions of the biomass-derived pyrolysis oil with hydrogen to form a lower-oxygen biomass-derived pyrolysis oil dominate while secondary polymerization reactions of biomass-derived pyrolysis oil components with themselves are reduced or minimized, thereby reducing or minimizing the formation of glassy brown polymers or powdery brown char on the deoxygenating catalyst, as well as reducing or minimizing viscosity increases in the heated diluted py-oil feed stream 16 resulting from continued recycling of the low-oxygen biomass-derived pyrolysis oil.

In an exemplary embodiment, the low-oxygen biomass-derived pyrolysis oil effluent 20 is removed from the reactor 18 may be passed through a chiller 22 and then passed to a separation zone 23. In an exemplary embodiment, the chiller 22 cools the effluent stream 20 to a temperature of from about 30 to about 60° C. (86 to 140° F.). The separation zone 23 removes light volatiles, water, light liquids, and solids (if present) from the effluent stream 20 using one or more separation vessels, fractionation columns, heaters, condensers exchangers, pipes, pumps, compressors, controllers, and/or the like. In an exemplary embodiment and as illustrated, the first phase separation is conducted with a high pressure separator 24. The effluent stream 20 is introduced to the high pressure separator 24 and is separated into a water-containing (i.e., aqueous) stream 26, the gaseous hydrogen stream 30 (discussed above), and a non-aqueous liquid stream 36 comprising water-depleted low-oxygen-py-oil stream. The aqueous stream 26 may be passed along to an aqueous-organic separation zone (not shown). The gaseous hydrogen stream 30, or optionally a portion of the gaseous stream 30, may be combined with a hydrogen from a make-up hydrogen stream 31 and passed to a compressor 32, to generate the hydrogen-containing gas stream 33 described above.

The non-aqueous liquid stream 36 may be directed to a distillation column 38, where the water-depleted low-oxygen-py-oil stream 36 is separated. In an exemplary embodiment, the distillation column 38 is a fractionation column wherein fractions are separated at a cutpoint temperature between 190 to 230° C. (374 to 446° F.), or, in at least one embodiment about 215° C. (419° F.). An overhead stream 40 from the distillation column 38 may be passed through a chiller 44, and delivered to a phase separator 46, which separates an organic volatile gas stream 48, an aqueous stream 50, and a low-molecular weight fraction organic liquid phase 52. In one embodiment, the organic volatile gas stream 48 and aqueous stream 50 are diverted and collected, while the low-molecular weight fraction organic liquid phase 52 is passed through a pump 56 and sent to a heater 34 to generate the recycle stream 14 discussed above. As indicated above, the recycle stream 14 is combined with the biomass-derived pyrolysis oil stream 12, and is thus recycled through the deoxygenation reactor 18. In some embodiments, a portion of the low-molecular weight fraction organic liquid phase 52 is diverted prior to entering the heater 34 and instead directed to be combined with a bottoms stream 42 from the distillation column 38. The bottoms stream 42 from the distillation column 38 comprises the product fuel stream that can be used in a burner. The fuel will contain some oxygenated hydrocarbons (i.e., greater than 1 wt %, in some instances between 15 to 20 wt %) making it unusable in certain engines; however, it may be used in burners to provide heat, such as burners in a refinery. This would allow a refinery to produce its own burner fuel from a renewable source. Since the carbon content of the burner fuel is renewable, the use of the burner fuel derived from the pyrolysis oil will lower the carbon footprint of the refinery.

In other embodiments, the process may include one or more additional optional elements at least for the manipulation of temperature and/or water content in various py-oil streams throughout the process.

Figure 2:
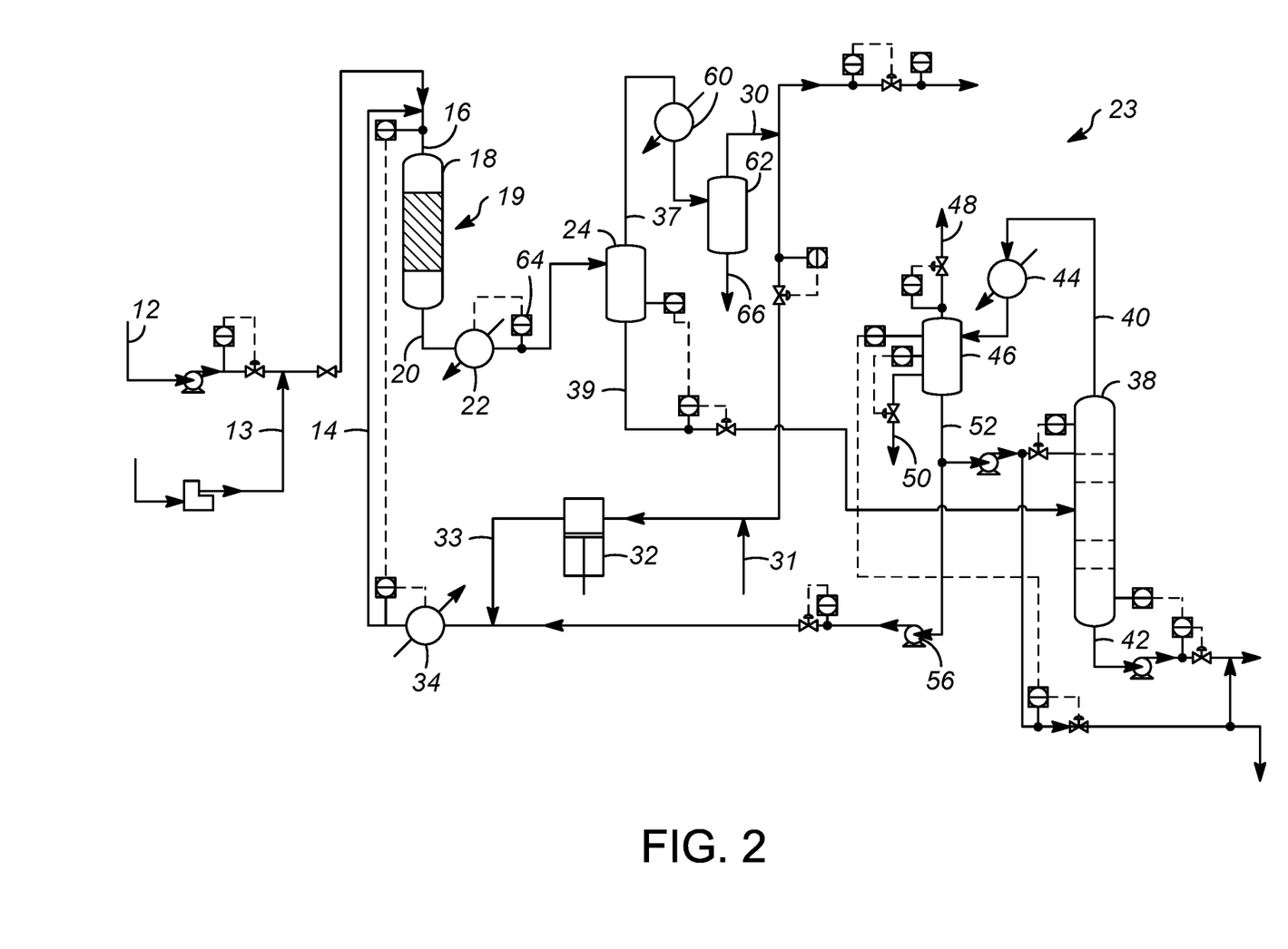
FIG. 2 shows another process flow diagram for a process according to one or more embodiments of the present invention; and, FIG. 3 shows yet another process flow diagram for a process according to one or more embodiments of the present invention.

For instance, in a second exemplary embodiment shown in FIG. 2, the process is as described above, but is further configured to provide improved control of the temperature of the effluent stream 20 when it is introduced to the high pressure separator 24.

Specifically, the outlet temperature of the chiller 22 may be monitored with a temperature controller 64 and the temperature and/or flow rate of coolant through the chiller 22 adjusted to achieve a desired temperature of the chilled effluent stream 20. In this way, the temperature of the effluent stream 20 can be controlled to a temperature preferably between 160 to 180° C. (320 to 356° F.) when introduced to the high pressure separator 24. Instead of producing three phases, in this embodiment the high pressure separator 24 produces an overhead gaseous stream 37 and a liquid stream 39 that comprises both the aqueous phase and the organic phase. The overhead gaseous stream 37 may be passed through a condenser 60 and then to a separation vessel 62 to separate any water in the overhead stream into a water stream 66 and the gaseous stream 30 which both may be processed as discussed above. The water contained in the liquid stream 39 may be separated in the phase separator 46 associated with the distillation column 38. Such a configuration is believed to be less costly as it less expensive to increase the size of the low pressure, overhead receiver of the distillation column than to provide a large high pressure separator.

Figure 3:
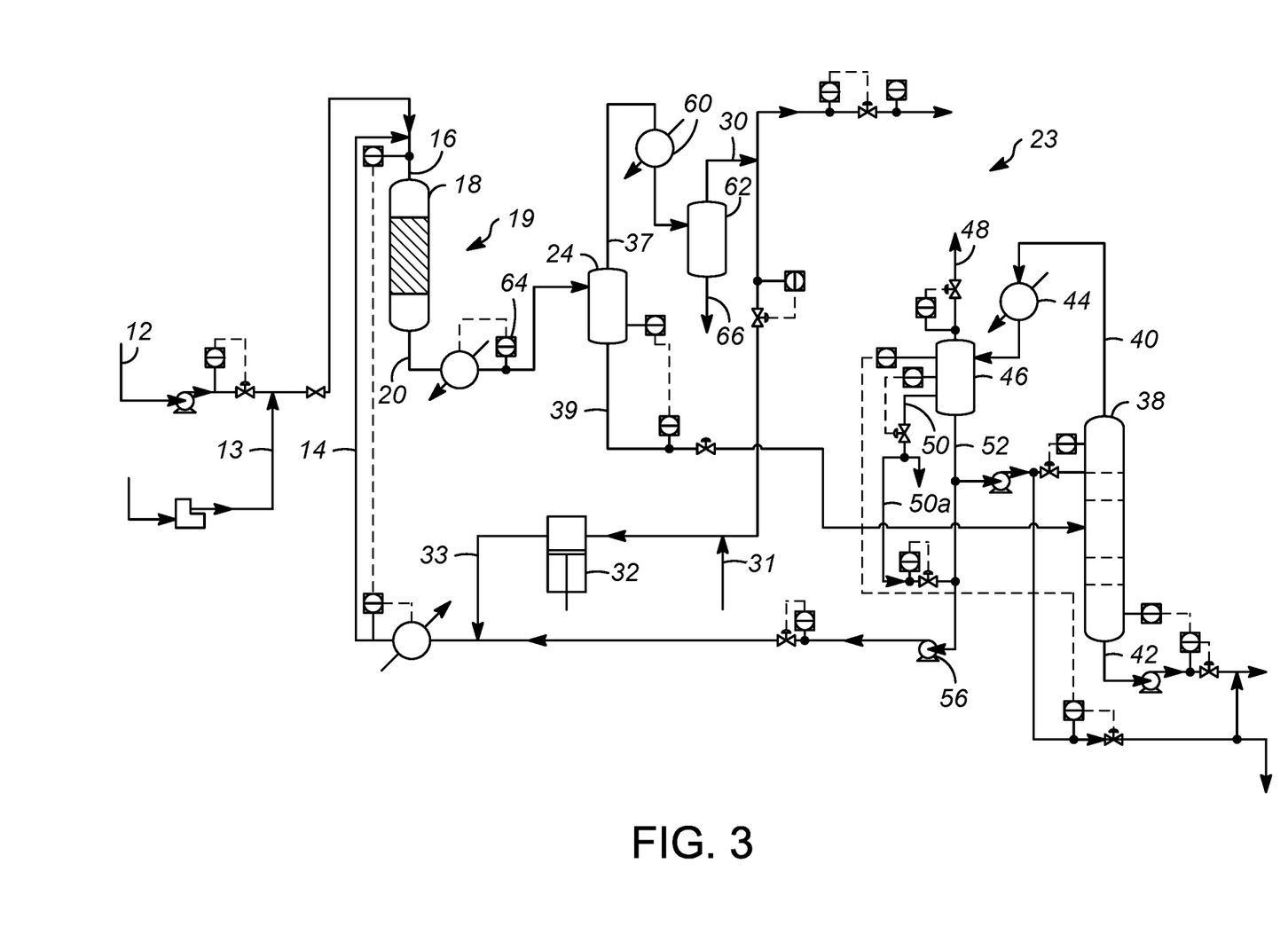

In a third exemplary embodiment shown in FIG. 3, the process is as initially described with respect to FIG. 2, but is further configured to provide improved control of the amount of residual water in the recycle stream 14 when it is combined with the biomass-derived pyrolysis oil stream 12 and introduced to the reactor 18. Specifically, a portion 50a of the aqueous stream 50 from the phase separator 46 associated with the distillation column 38 may be combined with the low-molecular weight fraction organic liquid phase 52 from the phase separator 46. The use of water in the recycle stream 14 is to control fouling in the reactor 18 from the reactions occurring therein.

In accordance with various processes described herein, as well as obvious variations thereof, the production of a burner fuel from a biomass has been provided which has improved thermal stability and which has a reduced amount of corrosive compounds. The partially deoxygenated fuel product can be used in a burner the refinery or in other applications as a "green" fuel.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Specific Embodiments

While the following is described in conjunction with specific embodiments, it will be understood that this description is intended to illustrate and not limit the scope of the preceding description and the appended claims.

A first embodiment of the invention is a process for producing a partially deoxygenated fuel from a biomass-derived pyrolysis oil, the process comprising heating a biomass-derived pyrolysis oil with a recycle stream to form a heated biomass-derived pyrolysis oil, the recycle stream comprising a low-oxygen-py-oil recycle stream; converting the heated biomass-derived pyrolysis oil in the presence of hydrogen in a reaction zone having a catalyst and being configured to deoxygenate and hydrogenate the heated biomass-derived pyrolysis oil and provide a low-oxygen biomass-derived pyrolysis oil effluent; and, separating the low-oxygen biomass-derived pyrolysis oil effluent into at least one aqueous stream, the recycle stream, at least one fuel gas stream, and at least one product fuel stream, the product fuel stream including greater than 1 wt % oxygenates and comprising a fuel for a burner. An embodiment of the invention is one, any or all of prior embodiments in this paragraph up through the first embodiment in this paragraph, wherein a weight ratio of recycle stream to biomass-derived pyrolysis oil is between about 3:1 and 16:1. An embodiment of the invention is one, any or all of prior embodiments in this paragraph up through the first embodiment in this paragraph wherein the recycle stream comprises between about 7 to about 28 wt % oxygenates. An embodiment of the invention is one, any or all of prior embodiments in this paragraph up through the first embodiment in this paragraph wherein the recycle stream comprises between about 15 to about 20 wt % oxygenates. An embodiment of the invention is one, any or all of prior embodiments in this paragraph up through the first embodiment in this paragraph further comprising mixing an additive with the biomass-derived pyrolysis oil before the biomass-derived pyrolysis oil is heated. An embodiment of the invention is one, any or all of prior embodiments in this paragraph up through the first embodiment in this paragraph wherein the recycle stream includes a portion of a water stream from the separation zone. An embodiment of the invention is one, any or all of prior embodiments in this paragraph up through the first embodiment in this paragraph wherein the separation zone includes a distillation column being operated with a cutpoint of between about 190 to 230° C. to separate the at least one product fuel stream. An embodiment of the invention is one, any or all of prior embodiments in this paragraph up through the first embodiment in this paragraph further comprising increasing a temperature of the heated biomass-derived pyrolysis oil in order to increase oligomerization reactions within the reaction zone. An embodiment of the invention is one, any or all of prior embodiments in this paragraph up through the first embodiment in this paragraph further comprising decreasing a ratio of recycle stream to biomass-derived pyrolysis in order to increase oligomerization reactions within the reaction zone. An embodiment of the invention is one, any or all of prior embodiments in this paragraph up through the first embodiment in this paragraph further comprising burning the product fuel stream in a burner.

A second embodiment of the invention is a single stage process for producing a partially deoxygenated fuel from a biomass-derived pyrolysis oil, the process comprising combining a biomass-derived pyrolysis oil with a recycle stream in order to heat the biomass-derived pyrolysis oil and to form a heated biomass-derived pyrolysis oil, the recycle stream comprising a low-oxygen-py-oil recycle stream; passing the heated biomass-derived pyrolysis oil to a deoxygenation zone having a deoxygenation catalyst and being configured to deoxygenate a portion of the heated biomass-derived pyrolysis oil and to provide a low-oxygen biomass-derived pyrolysis oil effluent; passing the low-oxygen biomass-derived pyrolysis oil effluent to a separation zone configured to separate the low-oxygen biomass-derived pyrolysis oil effluent into at least one aqueous stream, at least one fuel gas stream, the recycle stream, and at least one product fuel stream, the product fuel stream comprising a fuel for a burner; and, heating the recycle stream before combining the recycle stream with the biomass-derived pyrolysis oil. An embodiment of the invention is one, any or all of prior embodiments in this paragraph up through the first embodiment in this paragraph, wherein the separation zone includes at least one high temperature separator vessel configured to separate the low-oxygen biomass-derived pyrolysis oil effluent into a liquid phase and a gaseous phase. An embodiment of the invention is one, any or all of prior embodiments in this paragraph up through the first embodiment in this paragraph, wherein liquid phase comprises a non-aqueous liquid phase and wherein the at least one high temperature separator vessel also provides an aqueous phase, and wherein the process includes compressing the gaseous phase to form the recycle stream. An embodiment of the invention is one, any or all of prior embodiments in this paragraph up through the first embodiment in this paragraph further comprising passing the non-aqueous liquid phase to a distillation column in the separation zone, the distillation column providing an overhead stream, and a bottoms stream, the bottoms stream comprising the product fuel stream. An embodiment of the invention is one, any or all of prior embodiments in this paragraph up through the first embodiment in this paragraph further comprising passing the overhead stream from the distillation column to a receiver vessel in the separation zone, the receiver vessel configured to separate the overhead stream into a liquid hydrocarbon stream, a water stream, and a fuel gas stream, wherein a least a portion of the liquid hydrocarbon stream comprises the recycle stream. An embodiment of the invention is one, any or all of prior embodiments in this paragraph up through the first embodiment in this paragraph further comprising passing the gaseous phase from the high temperature separator vessel through a condenser and to a separation vessel configured to provide a water stream and a gaseous stream; and, compressing the gaseous stream to form the recycle stream. An embodiment of the invention is one, any or all of prior embodiments in this paragraph up through the first embodiment in this paragraph further comprising passing the liquid phase to a distillation column in the separation zone, the distillation column providing an overhead stream, and a bottoms stream, the bottoms stream comprising the product fuel stream. An embodiment of the invention is one, any or all of prior embodiments in this paragraph up through the first embodiment in this paragraph further comprising passing the overhead stream from the distillation column to a receiver vessel in the separation zone, the receiver vessel configured to separate the overhead stream into a liquid hydrocarbon stream, a water stream, and a fuel gas stream, wherein a least a portion of the liquid hydrocarbon stream comprises the recycle stream. An embodiment of the invention is one, any or all of prior embodiments in this paragraph up through the first embodiment in this paragraph wherein the recycle stream includes a portion of the water stream from the separation zone. An embodiment of the invention is one, any or all of prior embodiments in this paragraph up through the first embodiment in this paragraph wherein the separation zone includes at least one high temperature separator vessel configured to separate the low-oxygen biomass-derived pyrolysis oil effluent into liquid phase and a gaseous phase, wherein the liquid phase includes water and hydrocarbons.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A process for producing a partially deoxygenated fuel from a biomass-derived pyrolysis oil, the process comprising:
    heating a biomass-derived pyrolysis oil with a recycle stream to form a heated biomass-derived pyrolysis oil, the recycle stream comprising a low-oxygen-py-oil recycle stream;
    converting the heated biomass-derived pyrolysis oil in the presence of hydrogen in a reaction zone having a catalyst and being configured to deoxygenate and hydrogenate the heated biomass-derived pyrolysis oil and provide a low-oxygen biomass-derived pyrolysis oil effluent;
    decreasing a ratio of recycle stream to biomass-derived pyrolysis in order to increase oligomerization reactions within the reaction zone; and
    separating the low-oxygen biomass-derived pyrolysis oil effluent in a separation zone into at least one aqueous stream, the recycle stream, at least one fuel gas stream, and at least one product fuel stream, the product fuel stream including greater than 1 wt % oxygenates and comprising a fuel for a burner.

2. The process of claim 1, wherein a weight ratio of recycle stream to biomass-derived pyrolysis oil is between about 3:1 and 16:1.

3. The process of claim 1 wherein the recycle stream comprises between about 7 to about 28 wt % oxygenates.

4. The process of claim 3 wherein the recycle stream comprises between about 15 to about 20 wt % oxygenates.

5. The process of claim 1 further comprising mixing an additive with the biomass-derived pyrolysis oil before the biomass-derived pyrolysis oil is heated.

6. The process of claim 1 wherein the recycle stream includes a portion of a water stream from the separation zone.

7. The process of claim 1 wherein the separation zone includes a distillation column being operated with a cutpoint of between about 190 to 230° C. to separate the at least one product fuel stream.

8. The process of claim 1 further comprising increasing a temperature of the heated biomass-derived pyrolysis oil in order to increase oligomerization reactions within the reaction zone.

9. The process of claim 1 further comprising burning the product fuel stream in a burner.

10. A single stage process for producing a partially deoxygenated fuel from a biomass-derived pyrolysis oil, the process comprising:
   combining a biomass-derived pyrolysis oil with a recycle stream in order to heat the biomass-derived pyrolysis oil and to form a heated biomass-derived pyrolysis oil, the recycle stream comprising a low-oxygen-py-oil recycle stream;
   passing the heated biomass-derived pyrolysis oil to a deoxygenation zone having a deoxygenation catalyst and being configured to deoxygenate a portion of the heated biomass-derived pyrolysis oil and to provide a low-oxygen biomass-derived pyrolysis oil effluent;
   passing the low-oxygen biomass-derived pyrolysis oil effluent to a separation zone configured to separate the low-oxygen biomass-derived pyrolysis oil effluent into at least one aqueous stream, at least one fuel gas stream, the recycle stream, and at least one product fuel stream, the product fuel stream comprising a fuel for a burner; and
   heating the recycle stream before combining the recycle stream with the biomass-derived pyrolysis oil.

11. The process of claim 10, wherein the separation zone includes at least one high temperature separator vessel configured to separate the low-oxygen biomass-derived pyrolysis oil effluent into a liquid phase and a gaseous phase.

12. The process of claim 11, wherein liquid phase comprises a non-aqueous liquid phase and wherein the at least one high temperature separator vessel also provides an aqueous phase, and wherein the process includes compressing the gaseous phase to form the recycle stream.

13. The process of claim 12 further comprising passing the non-aqueous liquid phase to a distillation column in the separation zone, the distillation column providing an overhead stream, and a bottoms stream, the bottoms stream comprising the product fuel stream.

14. The process of claim 13 further comprising passing the overhead stream from the distillation column to a receiver vessel in the separation zone, the receiver vessel configured to separate the overhead stream into a liquid hydrocarbon stream, a water stream, and a fuel gas stream, wherein a least a portion of the liquid hydrocarbon stream comprises the recycle stream.

15. The process of claim 11 further comprising passing the gaseous phase from the high temperature separator vessel through a condenser and to a separation vessel configured to provide a water stream and a gaseous stream; and compressing the gaseous stream to form the recycle stream.

16. The process of claim 15 further comprising passing the liquid phase to a distillation column in the separation zone, the distillation column providing an overhead stream, and a bottoms stream, the bottoms stream comprising the product fuel stream.

17. The process of claim 16 further comprising passing the overhead stream from the distillation column to a receiver vessel in the separation zone, the receiver vessel configured to separate the overhead stream into a liquid hydrocarbon stream, a water stream, and a fuel gas stream, wherein a least a portion of the liquid hydrocarbon stream comprises the recycle stream.

18. The process of claim 17 wherein the recycle stream includes a portion of the water stream from the separation zone.

19. The process of claim 10 wherein the separation zone includes at least one high temperature separator vessel configured to separate the low-oxygen biomass-derived pyrolysis oil effluent into liquid phase and a gaseous phase, wherein the liquid phase includes water and hydrocarbons.

* * * * *